(12) United States Patent
Dannenhauer et al.

(10) Patent No.: US 6,746,042 B2
(45) Date of Patent: Jun. 8, 2004

(54) VEHICLE INTERIOR LINING AND METHOD OF PRODUCING A VEHICLE INTERIOR LINING

(75) Inventors: Reiner Dannenhauer, Welzheim (DE); Jens Debler, Herlikofen (DE); Bernd Hägele, Göggingen (DE); Norbert Lang, Leinzell (DE); Philipp Ritter, Schwäbisch-Gmünd (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/050,006

(22) Filed: Jan. 15, 2002

(65) Prior Publication Data

US 2002/0093181 A1 Jul. 18, 2002

(30) Foreign Application Priority Data

Jan. 15, 2001 (DE) .......................... 101 01 525
May 14, 2001 (DE) .......................... 101 23 353

(51) Int. Cl.⁷ ..................... B60R 21/16; B60R 21/22
(52) U.S. Cl. .................... 280/732; 280/728.3
(58) Field of Search ............. 280/728.2, 728.3, 280/732

(56) References Cited

U.S. PATENT DOCUMENTS

| | | | | |
|---|---|---|---|---|
| 5,116,079 A | * | 5/1992 | Rhodes, Jr. ................ | 280/732 |
| 5,154,444 A | * | 10/1992 | Nelson ...................... | 280/732 |
| 5,425,548 A | * | 6/1995 | Rasmussen ............... | 280/782.2 |
| 5,560,643 A | * | 10/1996 | Lang et al. ............... | 280/728.2 |
| 5,584,501 A | * | 12/1996 | Walters ................... | 280/728.2 |
| 5,588,668 A | * | 12/1996 | Emambakhsh et al. .. | 280/728.2 |
| 5,762,360 A | * | 6/1998 | Damman et al. ........ | 280/728.2 |
| 5,772,241 A | * | 6/1998 | Heilig ..................... | 280/731 |
| 5,826,901 A | * | 10/1998 | Adomeit ................. | 280/728.2 |
| 5,941,558 A | * | 8/1999 | Labrie et al. ........... | 280/728.3 |
| 6,422,600 B1 | * | 7/2002 | Crohn et al. ............ | 280/740 |
| 6,467,799 B2 | * | 10/2002 | Adomeit et al. ........ | 280/728.2 |

FOREIGN PATENT DOCUMENTS

WO    WO 02/14117    *  2/2002

* cited by examiner

*Primary Examiner*—Ruth Ilan
(74) *Attorney, Agent, or Firm*—Tarolli, Sundheim, Covell & Tummino L.L.P.

(57) ABSTRACT

The invention relates to a method of producing a vehicle interior lining, especially a dashboard having a carrier part and, attached to the carrier part, a gas bag module containing a gas bag carrier and a gas bag that has a folded package section. The gas bag, together with its package section, is placed into a gas bag receptacle that is formed on the gas bag carrier and that has an outlet opening for the gas bag. The outlet opening is at least partially closed in the area of the package section by a rigid part. An outside surface of the carrier part is foam-encapsulated with a plastic layer in a state in which the gas bag module is connected to the carrier part. Moreover, the invention relates to a vehicle interior lining.

20 Claims, 2 Drawing Sheets

VEHICLE INTERIOR LINING AND METHOD OF PRODUCING A VEHICLE INTERIOR LINING

TECHNICAL FIELD

The invention relates to a method of producing a vehicle interior lining, especially a dashboard having a carrier part and, attached to the carrier part, a gas bag module containing a gas bag carrier and a gas bag that has a folded package section. The invention also relates to a vehicle interior lining.

BACKGROUND OF THE INVENTION

Vehicle interior linings are manufactured in the largest possible sections in order to save assembly costs. This also applies to the dashboard that has to contain a passenger-side gas bag in modern vehicles in order to protect the passenger against injury in case of an accident.

In order to make the interior of the vehicle more comfortable for an occupant, in some cases, parts of the vehicle interior lining, also including the dashboard, are covered with a soft, resilient foamed material. The foam layer alone is not dimensionally stable enough, as a result of which it is applied onto a carrier part that consists, for example, of a harder injection molded plastic or of pressed materials, and that defines the shape of the vehicle interior lining. Until now, a gas bag module, for example, for a passenger-side gas bag, has been mounted under the carrier part so that the outlet opening of the gas bag is covered by a section of the carrier part. This section of the carrier part, which can be configured, for instance, as a conventional flap, can be dispensed with if the carrier part is covered with a foam layer, since the dimensional stability of the foam layer that is applied onto the carrier part is sufficiently high to create an esthetically pleasing surface that protects the gas bag underneath from being damaged. This gives rise to the decisive advantage that it is possible to dispense with the otherwise necessary separate covering flap, which is made of a rigid plastic material and is attached to the carrier part either by means of complex hinge mechanisms or else which has to have predetermined breaking points that are complicated to create.

U.S. Pat. No. 5,711,545 describes such a vehicle interior lining. At the desired place, the carrier part forms a receptacle for the gas bag module in the form of an depression, the folded gas bag being placed in such a way that it fills the depression. A flexible protective layer, which can be, for example, a paper-based product and which does not contribute to the stability, is placed over the gas bag. A plastic layer, which forms the visible part of the lining and makes a one-piece transition to the cover of the gas bag module, is foamed over this flexible protective layer, which is supposed to prevent the foamed material from penetrating into the gas bag module. For this purpose, the gas bag module is pre-mounted on the carrier part, covered with the flexible protective cover, inserted into a foaming mold and foamed. During the foaming process, it can happen that the folded gas bag package is compressed by the pressure that prevails in the foaming mold. When the pressure subsides, the gas bag package decompresses again, as a result of which the surface of the foam layer can be detrimentally affected.

Therefore, the object of the invention is to propose a method with which such a detrimental effect cannot occur. Moreover, a vehicle interior lining, especially a dashboard, is to be provided that allows an especially fast deployment of the gas bag, whilst nevertheless, only small forces are transmitted to the vehicle occupant by the unfolding gas bag.

BRIEF SUMMARY OF THE INVENTION

The method according to the present invention of producing a vehicle interior lining, especially a dashboard, provides that the lining has a carrier part and, attached to the carrier part, a gas bag module containing a gas bag carrier and a gas bag that has a folded package section (package-like folded section of the gas bag). The method comprises the following steps:

the gas bag, together with its package section, is placed into a gas bag receptacle that is formed on the gas bag carrier and that has an outlet opening for the gas bag;

the outlet opening is at least partially closed in an area of the package section by a rigid means;

an outside surface of the carrier part is foam-encapsulated with a plastic layer in a state in which the gas bag module is connected to carrier part.

By means of the rigid means, a compression of the package section of the gas bag is avoided during the foaming process so that no impairment of the surface of the foam layer can occur.

The carrier part advantageously has an opening for the unfolding of the gas bag, and the gas bag as well as the gas bag carrier lie in the projected area of the opening, i.e. in the opening or below it. Therefore, the foam layer is foamed onto the gas bag module directly, that is to say, without a stable intermediate layer.

The means preferably has such a strength that it is not substantially deformed by the pressure that is generated during the foaming process, so as to avoid a compression of the package section. The pressure in the foaming mold used is preferably between 2 and 10 bar, and especially preferably between 3 and 5 bar. Conventional foaming machines can be employed in this pressure range.

The deformation of the means is advantageously less than 5 mm and especially preferably less than 3 mm. A compression by this amount can be compensated for in the foam layer itself.

In order to prevent foam from penetrating into the gas bag module and in order to protect the gas bag module from environmental effects, a plastic foil is preferably arranged directly over the means before the carrier part is foam-encapsulated.

The method is especially well-suited for use with a gas bag carrier in which the gas bag receptacle is formed continuously along the edge of a middle plate of the gas bag carrier. Such a gas bag carrier can be used for modules that are particularly flat in shape and that have a relatively large lateral expansion, which is desirable for passenger gas bags. The middle plate is preferably flush with the outer surface of the carrier part and offers the necessary support for the foam layer in this area of the opening.

In order for the means not to interfere with the deployment of the gas bag out of the outlet opening of the gas bag receptacle during the unfolding of the gas bag, the means preferably has such a low strength that it frees the outlet opening in response to a force that is being exerted on the means by the unfolding gas bag when the gas bag module is activated. This can be achieved in that predetermined breaking points are provided at a suitable place in the means. Since the means can have much smaller dimensions and a lower weight than a conventional covering flap, the risk of injury to a vehicle occupant is low.

In a preferred embodiment of the method according to the invention, after the gas bag has been placed into the receptacle, the outlet opening is constricted in that the receptacle is compressed. In this case, the means is formed by the edge sections of the gas bag receptacle, which cause a constriction. No additional parts have to be used, which reduces the costs. Since the gas bag expands to a certain degree into the sections of the receptacle when it unfolds, thus freeing the outlet opening again, no loose parts are created that could be hurled into the vehicle interior. It is also possible for the gas bag receptacle to be compressed all the way down to just a narrow gap through which the gas bag can be pulled out of the gas bag receptacle when the gas bag unfolds. Thus, no additional force has to be used to free the outlet opening.

The invention also relates to a vehicle interior lining that is preferably made by a method according to the invention. In a preferred embodiment of such a vehicle interior lining, the means is a frame with a U-shaped profile that surrounds the gas bag receptacle, the open side of the U-shaped profile facing the inside of the frame and one leg of the U-shaped profile at least partially closing the outlet opening. After the package section of the gas bag is placed into the gas bag receptacle, the frame, which preferably has a certain amount of flexibility, can be placed onto the surrounding gas bag receptacle. The clamping that can be achieved in this manner can be selected in such a way that no further attachment is necessary. The component is simple to mount since it simply has to be placed over the gas bag receptacle.

In another preferred embodiment of the vehicle interior lining, the means is constituted by a projection of the carrier part. In this manner, no additional component has to be provided. When the gas bag module is attached onto the carrier part, the gas bag receptacle is arranged below the projection so that the projection at least partially closes the outlet opening.

In yet another preferred embodiment of a vehicle interior lining, the means is constituted by a projection formed on the gas bag carrier. In this case as well, no additional component has to be provided.

The gas bag carrier can be made of plastic. This makes it possible to shape the projection as well as the gas bag receptacle onto the gas bag carrier in a single manufacturing step.

In the two latter embodiments, the gas bag receptacle can be laterally open along its outer circumferential edge. From the open side, the package section can be placed into the gas bag receptacle. In order to protect the gas bag against environmental influences, the open side can be covered by a flexible cover, e.g. a plastic foil. This flexible cover can also serve to keep the package section in its folded state.

The invention also relates to a vehicle interior lining preferably produced by means of the process according to the invention, comprising a carrier part made of a hard material and a foam layer made of a soft foamed material that covers an outer surface of the carrier part and that is at least partially connected to said carrier part, the carrier part having an opening and the foam layer covering and closing off the opening, and comprising a gas bag module that is integrated into the vehicle interior lining and that has a gas bag carrier having a middle plate that is at least partially surrounded by a gas bag receptacle to accommodate the gas bag, only one single gas bag layer extending over the middle plate, and the gas bag carrier being arranged in such a way that the middle plate lies in the projected area of the opening in the carrier part, i.e. preferably in or under the opening. Because of the middle plate and due to the fact that only one single layer of the gas bag lies over the middle plate, a flat unfolding of the gas bag can be achieved. This is especially advantageous for use for a passenger gas bag in a dashboard. The middle plate preferably assumes the support function of the carrier part for the foam layer in the area of the gas bag module. In this manner, the foam layer cannot be compressed from the outside, and the formation of a hollow space between the gas bag module and the foam layer is avoided. Since there is only one layer of the gas bag on the middle plate, the gas bag situated in the area of the middle plate cannot have a negative effect on the haptic characteristics of the vehicle interior lining. After all, numerous layers would lead to a greater yielding of the foam layer in the area of the opening.

Advantageously, a section of the gas bag folded into a package is arranged in the gas bag receptacle.

The dimensions of the opening in the carrier part are preferably equal to or larger than the dimensions of the middle plate, so that either only the middle plate or else the gas bag receptacle lies in the projected area of the opening.

The middle plate preferably has an extension in its main direction of extension that is at least twice as large as two times the extension of the gas bag receptacle in the main direction of extension of the middle plate. The extension is measured along the middle plate, and the main direction of extension is defined as the direction in which the middle plate has its largest extension. The large extension of the middle plate in conjunction with the fact that only one single gas bag layer lies over the middle plate promotes the flat, rapid unfolding of the gas bag. Further, the gas bag has a large initial outlet surface.

Preferably, the gas bag receptacle is configured continuously around the middle plate in order to allow a simple accommodation of the gas bag. Moreover, in this case, a simple folding procedure can be used for the gas bag.

It is favorable if the middle plate is essentially flush with the outer surface of the carrier part so that the foam layer in the area of the middle plate cannot be pushed in and the gas bag module under the foam layer is not outlined on the outside.

There can be a foil between the gas bag module and the foam layer. The foil can be provided with a coating in order to prevent the foam layer from becoming detached in the area of the gas bag module.

An outlet opening of the gas bag receptacle is preferably at least partially closed off by a rigid means. The means can extend in the area of the opening between the foam layer and the gas bag that is accommodated in the gas bag receptacle. This is especially favorable if the gas bag receptacle is also arranged underneath the opening since the rigid means prevents a compression of the foam layer over the section of the gas bag that is accommodated in the gas bag receptacle and that has several layers. The means can be formed by a constriction of the gas bag receptacle.

It is possible to configure the means in such a way that, as a result of a force that the unfolding gas bag exerts on the means when the gas bag module is activated, said means is moved in such a way that the outlet opening of the gas bag receptacle is freed. The gas bag can then unfold from the entire outlet opening.

As an alternative, it is possible to configure the means in such a way that it only partially closes the outlet opening of the gas bag and that it is so rigid that it keeps sections of the outlet opening closed, even while the gas bag is unfolding. The gas bag is then pulled out of the gas bag receptacle one piece at a time, so to speak.

The means can be configured as a cover placed on the gas bag receptacle, which allows simple assembly.

Preferably, the top of the means is essentially flush with the outer surface of the carrier part in order to prevent the gas bag module from being outlined under the foam layer.

In a possible embodiment, the gas bag carrier is attached to the bottom of the carrier part. A gas generator carrier can be formed in one piece with the gas bag carrier.

As an alternative, the gas bag carrier can be attached to the carrier part via a gas generator carrier that is configured as a separate part.

Preferably, the vehicle interior lining is a dashboard.

DETAILED DESCRIPTION OF PREFERRED EMBODIMENTS

Figure 1:
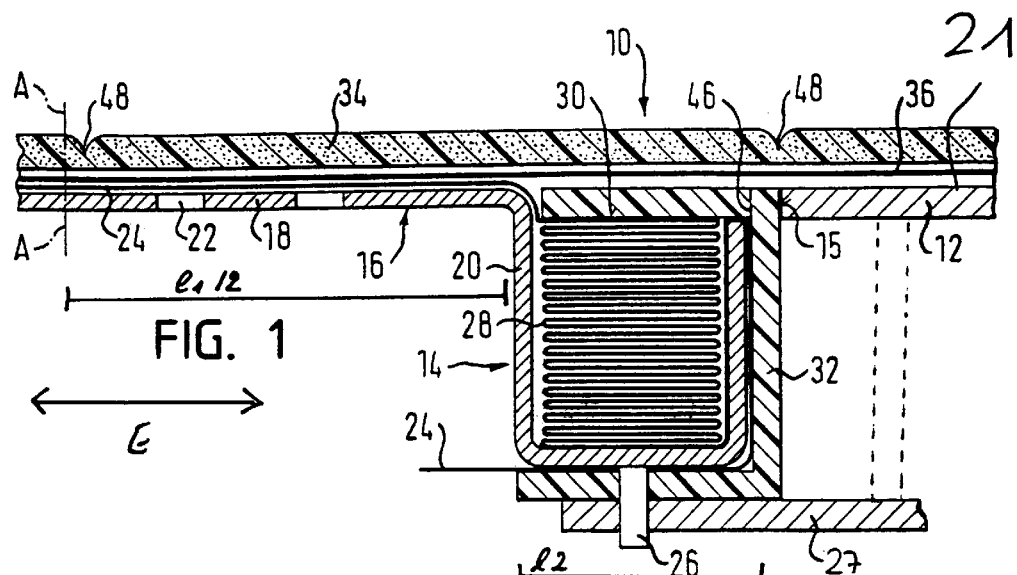
FIG. 1 is a sectional view of a part of the vehicle interior lining according to the invention in a first embodiment.

FIGS. 1 through 4 each show a vehicle interior lining in the form of a dashboard that was made by means of the method according to the invention. The line A—A shown in FIGS. 1 through 4 designates the middle axis of the gas bag carrier shown in FIG. 5. Thus, FIGS. 1 through 4 each show half of a section through the gas bag carrier.

The vehicle interior lining 10 has a carrier part 12 onto which a gas bag module 14 is attached. In the area of the gas bag module 14, the carrier part 12 has an opening 15 that is about the size of the gas bag carrier 16. The gas bag module 14 lies in the projected area of the opening 15, i.e. not laterally shifted with respect to the opening, but rather in or slightly below the opening 15. The gas bag module 14 is associated with the gas bag carrier 16, which is shown in greater detail in FIG. 5. In the embodiments shown here, the gas bag carrier 16 is an approximately square component with a middle plate 18 and, encircling the edge of the gas bag carrier 16, a U-shaped depression that forms a gas bag receptacle 20. The gas bag carrier 16 and the middle plate 18 do not have to be square. They can have different, also arched shapes, so that the middle plate can also be used to determine the desired shape of the vehicle interior lining. The middle plate 18 has outflow openings 22 through which gas can flow out of a gas generator (not shown) that is arranged underneath the gas bag carrier 16 into a gas bag and can inflate it.

The dimensions of the opening 15 in the carrier part 12 are equal to or larger than the dimensions of the middle plate so that at least the middle plate 18 lies under the opening.

Measured along its main direction of extension E, the extension 11 of the middle plate 18 is at least twice as large as two times the extension 12 of the gas bag receptacle 20. Here, the main direction of extension E is defined as the direction in which the middle plate 18 has its maximum extension.

The gas bag carrier 16 is arranged on the carrier part 12 in such a way that the middle plate is essentially flush with the outer surface 21 of the carrier part 12.

The gas bag carrier 16 is placed into a gas bag 24. The gas bag 24 can be attached to the gas bag carrier 16, for example, on studs 26 that can be formed on the bottom of the gas bag carrier 16. By means of the studs 26, the gas bag module 14 can also be attached to the bottom of the carrier part 12 or to a separate gas generator carrier 27 (shown schematically in FIG. 1) which is, in turn, attached to the carrier part 12 (see broken line).

The gas bag 24 has a package section 28 in which the gas bag fabric is laid in folds in such a way that at least two layers of the gas bag lie on top of each other. The gas bag is preferably folded in such a way that the gas bag 24 can be pulled out of the gas bag receptacle 30 one layer at a time. The package section 28 is arranged in the gas bag receptacle 20. Only one single layer of the gas bag lies over the middle plate 18 of the gas bag carrier. On its open side facing upwards, the gas bag receptacle 20 has a ring-shaped outlet opening 30 for the gas bag 24.

Moreover, a frame-shaped rigid means 32 in the form of a ring with a U-profile is provided, the open side of the U-profile facing the inside of the frame. The size of the means 32 is coordinated with the gas bag carrier 16 so that the U-profile can surround the gas bag receptacle 20. The outlet opening 30 is covered by one leg of the frame-shaped means 32. The means 32 is so pliable that it can be put onto the gas bag receptacle 20. It can be made, for example, of a thermoplastic elastomer that has the necessary flexibility.

The carrier part 12 and the gas bag module 14 are covered by a soft foam layer 34 that covers the entire vehicle interior lining. A plastic foil 36 is located between the carrier part 12 or the gas bag module 14 and the foam layer 34.

The vehicle interior lining 10 is manufactured by means of the following steps: the gas bag carrier 16 is placed into the gas bag 24, and the package section 28 is placed into the gas bag receptacle 20. The frame-shaped means 32 is put onto the gas bag receptacle 20 in such a way that one leg of its U-profile covers the outlet opening 30. Then the gas bag module 14 is attached to the carrier part. The carrier part and the gas bag module 14 are covered with the plastic foil 36, at least in the area of the gas bag module. This foil 36 serves to prevent foam from penetrating into the gas bag module and into interstices during the subsequent foaming process. Then the carrier part 12, with the gas bag module 14 attached to it, is placed into a foaming mold (not shown). The foam layer 34 is applied by means of a known foaming process. Finally, the finished vehicle interior lining 10 is taken out of the mold.

The pressure being exerted on the gas bag module or on the rigid means 32 during the foaming process is preferably between 2 and 10 bar and especially preferred between 3 and 5 bar. Under the influence of the pressure, the rigid means 32 is preferably deformed by less than 5 mm and especially preferred by less than 3 mm.

The gas generator can be assembled either at the same time as the gas bag module 14 or else after the foaming process.

In the further described embodiments, components already known retain the same reference numerals.

Figure 2:
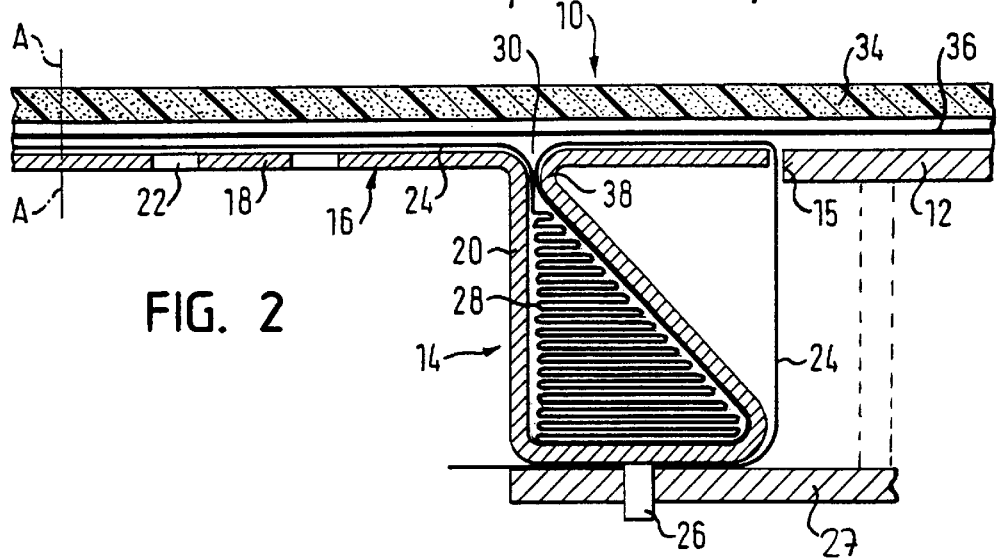
FIG. 2 is a sectional view of a part of the vehicle interior lining according to the invention in a second embodiment.

FIG. 2 shows a vehicle interior lining 10 according to a second embodiment. The method of producing a vehicle interior lining 10 according to FIG. 2 is carried out as follows: the gas bag carrier 16 is placed into the gas bag 24, and the package section 28 of the gas bag 24 is placed into the gas bag receptacle 20. Subsequently, the outer, upper edge of the gas bag receptacle 20 is bent in the direction of the middle plate 18 so that the outlet opening 30 is constricted. In this case, the rigid means is formed by the edge sections of the gas bag receptacle 20 that are bent together forming the constriction 38. In order to prevent sharp edges from coming into contact with the gas bag, the edge of the gas bag receptacle 20 can be extended toward the outside parallel to the middle plate 18. Subsequently, the gas bag module 14, as described in conjunction with the first embodiment, is connected to the carrier part 12 in such a way that the gas bag module 14 lies underneath the opening 15 in the carrier part 12, it is placed into the foaming mold and is foam-encapsulated. In this case as well, a foil 36 is inserted in order to prevent foam from penetrating into the gas bag module.

With a vehicle interior lining according to FIG. 2, the material thickness and the material strength of the gas bag receptacle 20 can be selected in such a way that the unfolding gas bag 24 can push open the constriction 38, thereby freeing the outlet opening 30.

As an alternative, the gas bag receptacle 20 can be permanently closed except for a narrow gap through which the gas bag 24 can be pulled out when it unfolds.

Figure 3:
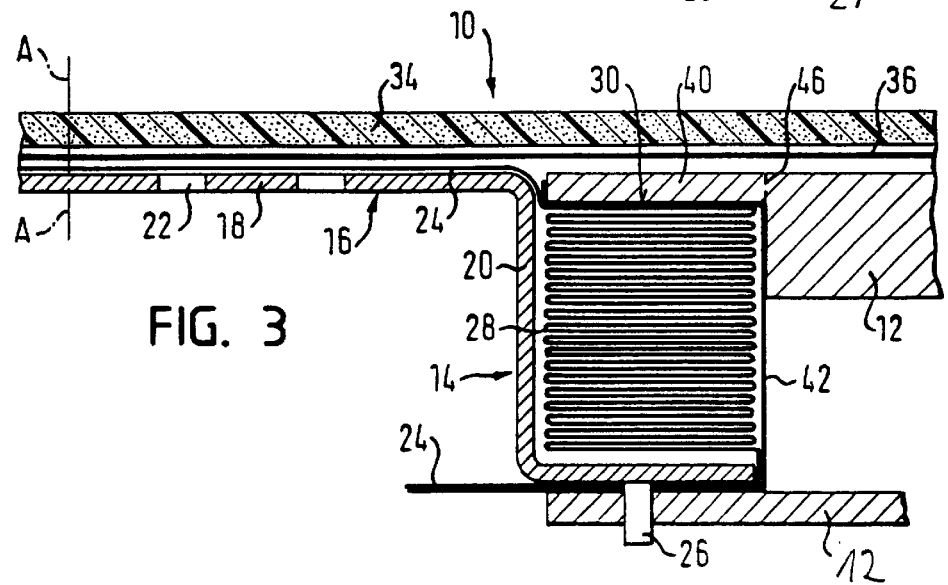
FIG. 3 is a sectional view of a part of the vehicle interior lining according to the invention in a third embodiment.

In the third embodiment of a vehicle interior lining 10 shown in FIG. 3, the rigid means is formed by a projection 40 of the carrier part 12, which extends over the outlet opening 30 when the gas bag module 14 is in the assembled state. The opening 15 formed in the carrier part 12 is smaller in this embodiment than in the previous embodiment and corresponds essentially to the dimensions of the middle plate 18 of the gas bag carrier 16.

The gas bag receptacle 20 is laterally open on its outer circumferential edge so that the gas bag carrier 16 has approximately the shape of an inverted, rectangular soup plate. The gas bag carrier 16 can, of course, also have a different, suitable contour.

In order to manufacture the vehicle interior lining, the gas bag carrier 16 is placed into the gas bag 24 and the folded package section 28 is placed from the open side into the gas bag receptacle 20. Subsequently, a thin, flexible protective foil 42, which serves to protect the gas bag 24 against environmental influences, is stretched over the outlet opening 30 and the open side of the gas bag receptacle 20. Subsequently, the gas bag module 14 is mounted onto the carrier part 12 in such a way that the projection 40 covers the outlet opening 30. Now the carrier part 12 with the gas bag module 14 is placed into the foaming mold and foam-encapsulated with the foam layer 34. Here, too, a protective foil can be arranged over the gas bag module 14.

Figure 4:
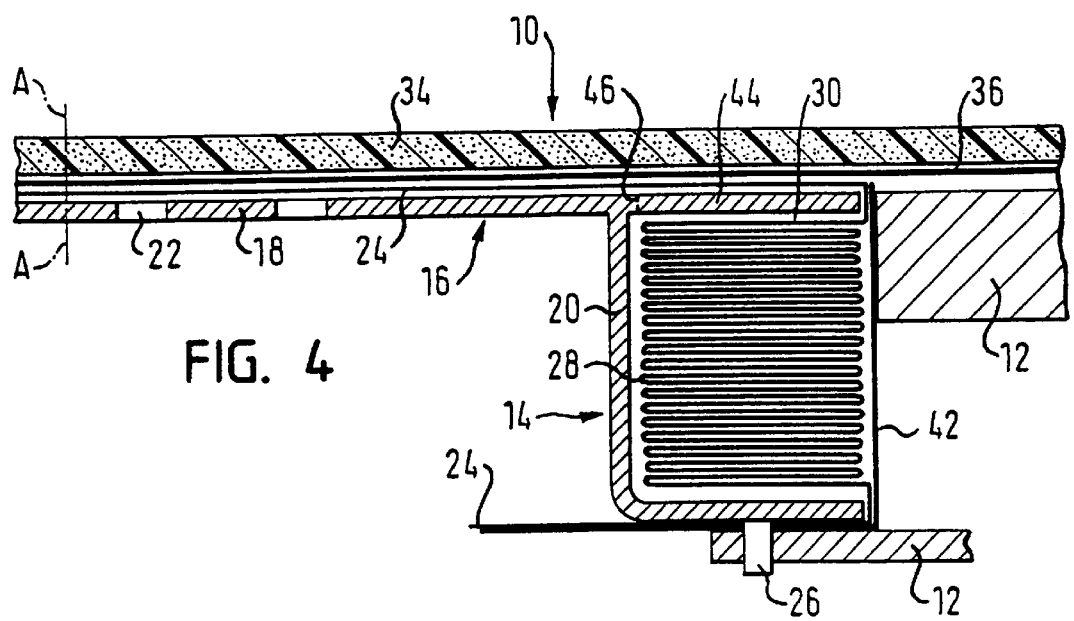
FIG. 4 is a sectional view of a part of the vehicle interior lining according to the invention in a fourth embodiment.
Figure 5:
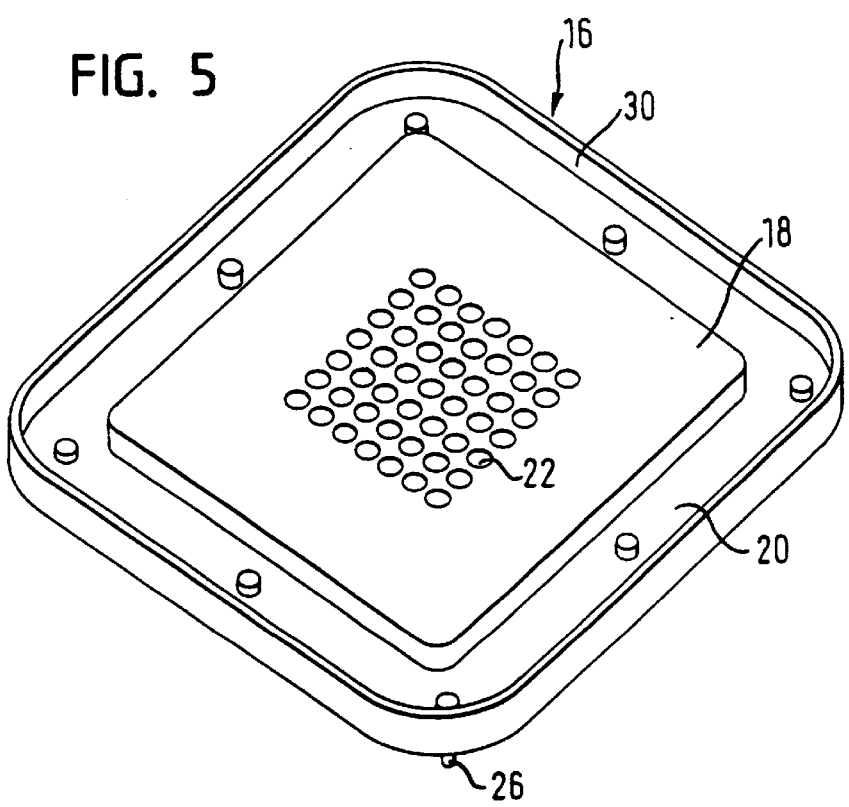
FIG. 5 is a perspective view of a gas bag carrier used in the embodiment according to FIG. 1.

The fourth embodiment of a vehicle interior lining 10 shown in FIG. 4 differs from the third embodiment in that a projection 44 is formed not on the carrier part 12 but rather on the middle plate 18 of the gas bag carrier 16. This projection 44 closes the outlet opening 30.

The vehicle interior lining 10 is manufactured as follows. The gas bag carrier 16 is placed into the gas bag 24, and the folded package section 28 is placed from the open side of the gas bag receptacle 20 into said gas bag receptacle. In this case as well, the open side of the gas bag carrier can once again be sealed with a protective foil 42. Then the gas bag module 14 is attached to the carrier part 12. The gas bag module can be covered with a foil 36 in order to protect it from penetration by foam. The carrier part 12 is placed into the foaming mold and foam-encapsulated with the foam layer 34.

In the embodiments according to FIGS. 1, 3 and 4, the rigid means, that is to say, the leg of the frame 32, the projection 40 of the carrier part 12 or the projection 44 of the gas bag carrier 16, advantageously has a predetermined breaking point or a foil hinge 46. When the gas bag 24 is unfolded, the rigid means breaks at this predetermined breaking point 46 or else it bends open and frees the outlet opening 30. Since the force exerted by the unfolding gas bag is greater than the force that is exerted on the means by the pressure exerted during the foaming process, there is no risk that the predetermined breaking point 46 will break during the foaming process.

When the gas bag unfolds, due to the gas flowing through the outflow openings 22 into the gas bag 24, the gas bag is first pressed against the foam layer 34 in the area of the middle plate 18. In order to facilitate the unfolding of the gas bag, the foam layer 34 can have weakened zones 48, which are indicated in FIG. 1. In this case, the foam layer 34 opens at the weakened zones 48, and the gas bag enters the interior of the vehicle. During the further unfolding of the gas bag 24, the part of the gas bag held in the package section 28 is pulled out; in so doing, preferably the predetermined breaking point or the predetermined breaking point 46 frees the outlet opening 30. The foils 36 and 42 are advantageously configured in such a way that they tear open without hindering the unfolding of the gas bag.

As an alternative, the means can also be so rigid that it does not yield when the gas bag 24 is unfolded. In this case, the means does not close the entire outlet opening 30 but rather a gap is left open. The gas bag 24 is pulled out through this gap when it is unfolded.

In another embodiment, not shown here, the rigid means is configured as a cover placed on the gas bag receptacle.

In all cases, the rigid means also serves to oppose a compression of the foam layer, e.g. by the vehicle occupant. Therefore, the foam layer 34 is supported at every point by a sturdy substrate, namely, outside of the gas bag module 14 by the carrier part 12, in the middle area of the opening 15 by the middle plate 18, and between the middle plate 18 and the carrier part 12 by the means 32, 38, 40, 44, which covers the gas bag receptacle 20. In order to prevent the gas bag module 14 from being outlined under the foam layer 34, the means 32, 38, 40, 44 and the middle plate 18 are flush with the outer surface 21 of the carrier part 12.

The invention is not limited to the use of gas bag carriers of the type described, but rather can be used with any kind of gas bag carriers and gas bag modules.

What is claimed is:

1. A vehicle interior lining having a carrier part and, attached to the carrier part, a gas bag module containing a gas bag carrier and a gas bag that has a folded package section, said gas bag, together with its package section, being placed into a gas bag receptacle that is formed on said gas bag carrier and that has an outlet opening for said gas bag; said outlet opening is at least partially closed in an area of said package section by a rigid means; an outside surface of said carrier part being foam-encapsulated with a plastic layer, and said means being constituted by a projection formed on the gas bag carrier.

2. The vehicle interior lining according to claim 1, wherein said gas bag carrier is attached to a bottom of said carrier part.

3. The vehicle interior lining according to claim 1, wherein the vehicle interior lining is a dashboard.

4. A vehicle interior lining comprising a carrier part and, attached to the carrier part, a gas bag module containing a gas bag that has a folded package section and a gas bag carrier having a central part, a gas bag receptacle being formed in said gas bag carrier continuously along a perimeter of said central part and having an outlet opening for said gas bag; said gas bag folded package section being located in said gas bag receptacle around the perimeter of said central part, said outlet opening being at least partially closed in an area of said package section by a rigid means;

and an outside surface of said carrier part being foam-encapsulated with a plastic layer.

5. The vehicle interior lining according to claim 4, wherein said gas bag receptacle is laterally open along the perimeter.

6. The vehicle interior lining according to claim 5, wherein an open side of said gas bag receptacle is covered by a flexible cover.

7. The vehicle interior lining according to claim 4, wherein said means is a frame with a U shaped profile that is arranged over said gas bag receptacle, an open side of said U shaped profile facing an inside of said frame, and one leg of said U shaped profile at least partially closing said outlet opening.

8. A vehicle interior lining comprising:
   a carrier part made of a dimensionally stable hard carrier material and
   a foam layer made of a soft foamed material that covers a large portion of an outer surface of said carrier part and that is at least partially connected to said carrier part, said soft foamed material being softer than the material of the carrier part and is not dimensionally stable,
   said carrier part having an opening and said foam layer covering and closing off said opening, and
   a gas bag module that is integrated into said vehicle interior lining and that has a gas bag carrier having a middle plate which is at least partially surrounded by a gas bag receptacle to accommodate a gas bag package, a portion of one of said gas bag receptacle and said carrier part overlying said gas bag package and underlying the soft foam layer,
   one single gas bag layer extending over the middle plate, and
   said gas bag carrier being arranged in such a way that, as seen in a projection, an outer surface of said middle plate lies in a projected area of said opening in said carrier part relative to said receptacle to support the soft foam layer overlying the middle plate.

9. The vehicle interior lining according to claim 8, wherein said package is a folded-up section of said gas bag.

10. The vehicle interior lining according to claim 8, wherein the dimensions of said opening in said carrier part are equal to or larger than said middle plate.

11. The vehicle interior lining according to claim 8, wherein said middle plate has an extension (L1) in its main direction of extension (E) that is at least fours times as large as an extension (L2) of said gas bag receptacle in a main direction of extension (E) of said middle plate.

12. The vehicle interior lining according to claim 8, wherein said gas bag receptacle is configured continuously around said middle plate.

13. The vehicle interior lining according to claim 8, wherein said middle plate is essentially flush with an outer surface of said carrier part.

14. The vehicle interior lining according to claim 8, wherein a foil is arranged between said gas bag module and said foam layer.

15. The vehicle interior lining according to claim 8, wherein an outlet opening of said gas bag receptacle is at least partially closed by a rigid means.

16. The vehicle interior lining according to claim 15, wherein said means is formed by a constriction of the gas bag receptacle.

17. The vehicle interior lining according to claim 15, wherein said means extends in an area of said opening between said foam layer and said gas bag that is accommodated in said gas bag receptacle, said means opposing a compression of said foam layer.

18. The vehicle interior lining according to claim 17, wherein said means is configured as a cover placed on said gas bag receptacle.

19. The vehicle interior lining according to claim 15, wherein a top of said means is essentially flush with an outer surface of said carrier part.

20. A vehicle interior lining comprising
   a carrier part made of a hard carrier material and
   a foam layer made of a soft foamed material that covers an outer surface of said carrier part and that is at least partially connected to said carrier part,
   said carrier part having an opening and said foam layer covering and closing off said opening, and comprising
   a gas bag module that is integrated into said vehicle interior lining and that has a gas bag carrier having a middle plate which is at least partially surrounded by a gas bag receptacle to accommodate said gas bag,
   only one single gas bag layer extending over the middle plate, and said gas bag carrier being arranged in such a way that said middle plate lies in a projected area of said opening in said carrier part,
   wherein an outlet opening of said gas bag receptacle is at least partially closed by a rigid means, and
   wherein said means at least partially closes said outlet opening of said gas bag receptacle and is so rigid that it keeps sections of said outlet opening closed, even while the gas bag is unfolding.

\* \* \* \* \*